United States Patent [19]

Lacotte et al.

[11] 3,912,922

[45] Oct. 14, 1975

[54] OPTICAL SENSOR FOR DETERMINING THE FOCUSSING ERROR IN AN OPTICAL ILLUMINATION SYSTEM EMBODYING A PROJECTION LENS

[75] Inventors: Jean Pierre Lacotte; Francois Le Carvennec; Jean Pierre Le Merer; Roland Malissin; Jean Paul Peltier, all of Paris, France

[73] Assignee: Thomson-Brandt, Paris, France

[22] Filed: Mar. 14, 1974

[21] Appl. No.: 451,370

[30] Foreign Application Priority Data

Mar. 19, 1973 France .............................. 73.09718

[52] U.S. Cl. ................ 250/204; 250/201; 250/234; 356/125

[51] Int. Cl.² ............................................ G01J 1/36

[58] Field of Search ............ 356/125, 126; 250/234, 250/201, 216, 204; 350/162 SF, 162 R; 354/25

[56] References Cited

UNITED STATES PATENTS

| | | | |
|---|---|---|---|
| 3,041,459 | 6/1962 | Greene, Jr. | 250/234 X |
| 3,542,475 | 11/1970 | Cooper | 356/126 X |
| 3,614,456 | 10/1971 | Hamisch | 250/234 |
| 3,756,723 | 9/1973 | Hock | 356/114 X |
| 3,768,910 | 10/1973 | Zanoni | 356/125 X |

*Primary Examiner*—Walter Stolwein
*Attorney, Agent, or Firm*—Cushman, Darby & Cushman

[57] ABSTRACT

The present invention relates to the determination of the focussing error of an optical projection system designed to project a concentrated spot onto a reflecting surface. The optical sensor in accordance with the invention utilises the projection objective lens of the optical projection system, in order to cause a fraction of the radiation reflected by said surface, to converge on photodetector means associated with electrical transmission means.

8 Claims, 7 Drawing Figures

OPTICAL SENSOR FOR DETERMINING THE FOCUSSING ERROR IN AN OPTICAL ILLUMINATION SYSTEM EMBODYING A PROJECTION LENS

The present invention relates to optical sensor devices of the kind which are intended to maintain in close coincidence with the surface of an object, the geometric point of convergence of a beam of radiant energy issuing from an optical projection system. Optical projection systems are useful for the diffusion of information bearing signals through the medium of a substrate carrying a recorded track. The application with which the invention is more particularly concerned, is that of determining and controlling the height of float of a writing-in or read out head equipped with an objective lens, the latter being responsible for the projection onto the surface of a substrate, of a concentrated spot designed to record or read out signals contained in a track.

In recording and reproducing apparatus of known kind, the variations in the interval of the objective lens from the illuminated area of the substrate, are produced by surface irregularities or by inadvertent displacements arising out of the transport function. These deviations are detected by distance sensors operating in particular by capacitive or inductive coupling, this meaning therefore that the substrate must be at least partially conductive since it has to do duty as a mating electrode or short-circuited secondary loop. Electrically operated distance sensors therefore impose a limitation upon the choice of the substrate and in addition to this necessity there is the further drawback that the monitoring area of this kind of sensor is substantially larger than the very small area illuminated by the projection objective lens. Consequently, any error in the flatness or uniformity of the substrate may be translated into terms of a false indication of the effective position of the geometric centre of convergence vis-a-vis the surface of the substrate at which the illumination is to be concentrated.

In order to overcome these drawbacks, it is proposed in accordance with the invention that determining the focussing error of an optical system for the concentrated illumination of the surface should be carried out by associating with the projection objective lens utilised for the concentration of the radiation, photoelectric transducer means which pick up selectively fractions of the energy passing through the projection objective lens, after reflection from said surface.

In accordance with the present invention, there is provided an optical sensor for determining the focussing error of an optical illumination system wherein a projection lens is used to focus a beam of radiant energy on a reflecting surface, said optical sensor comprising photodetector means arranged for selectively receiving at least one radiant energy portion emerging from the illuminated portion of said reflecting surface and focussed by said projection lens in the form of a diffraction pattern; the body of said diffraction pattern being substantially equal to the detection area of said photodetector means; said optical sensor further comprising electrical means connected to said photodetector means for supplying a voltage representative of said focussing error.

The invention likewise relates to the application of said optical sensor to an information recording or reproduction arrangement employing an information substrate, or data-carrier in other words, in the form of a disc or tape, and a projection objective lens to illuminate said substrate or carrier.

For a better understanding of the present invention and to show how the same may be carried into effect, reference will be made to the ensuing description and the attached figures among which:

Figure 7:
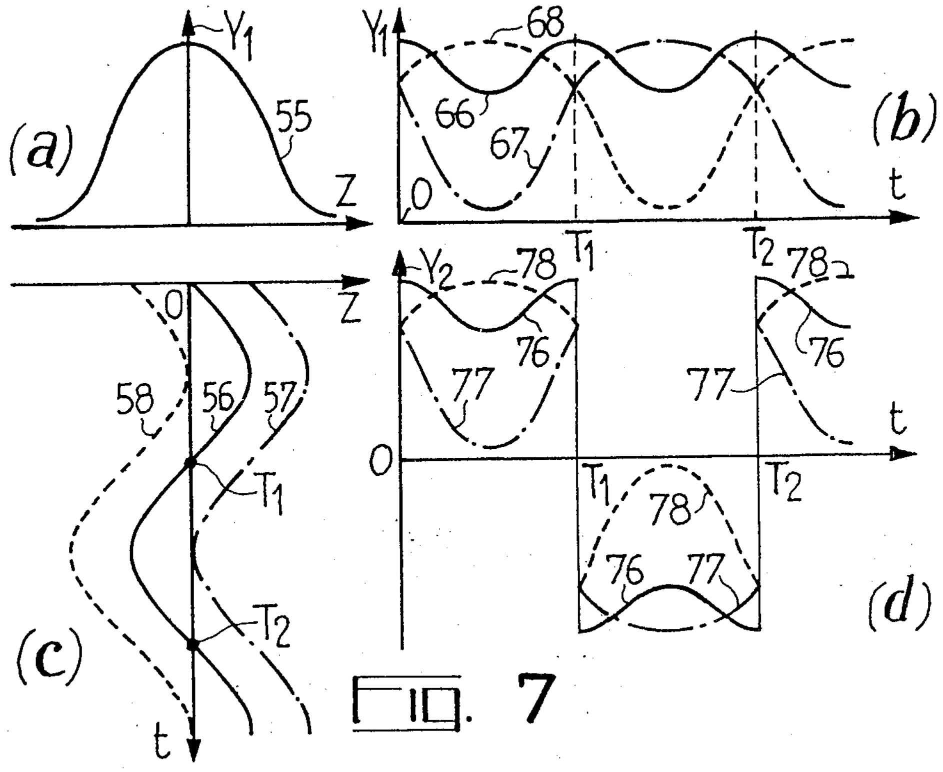

FIG. 7 displays explanatory diagrams.

Figure 1:
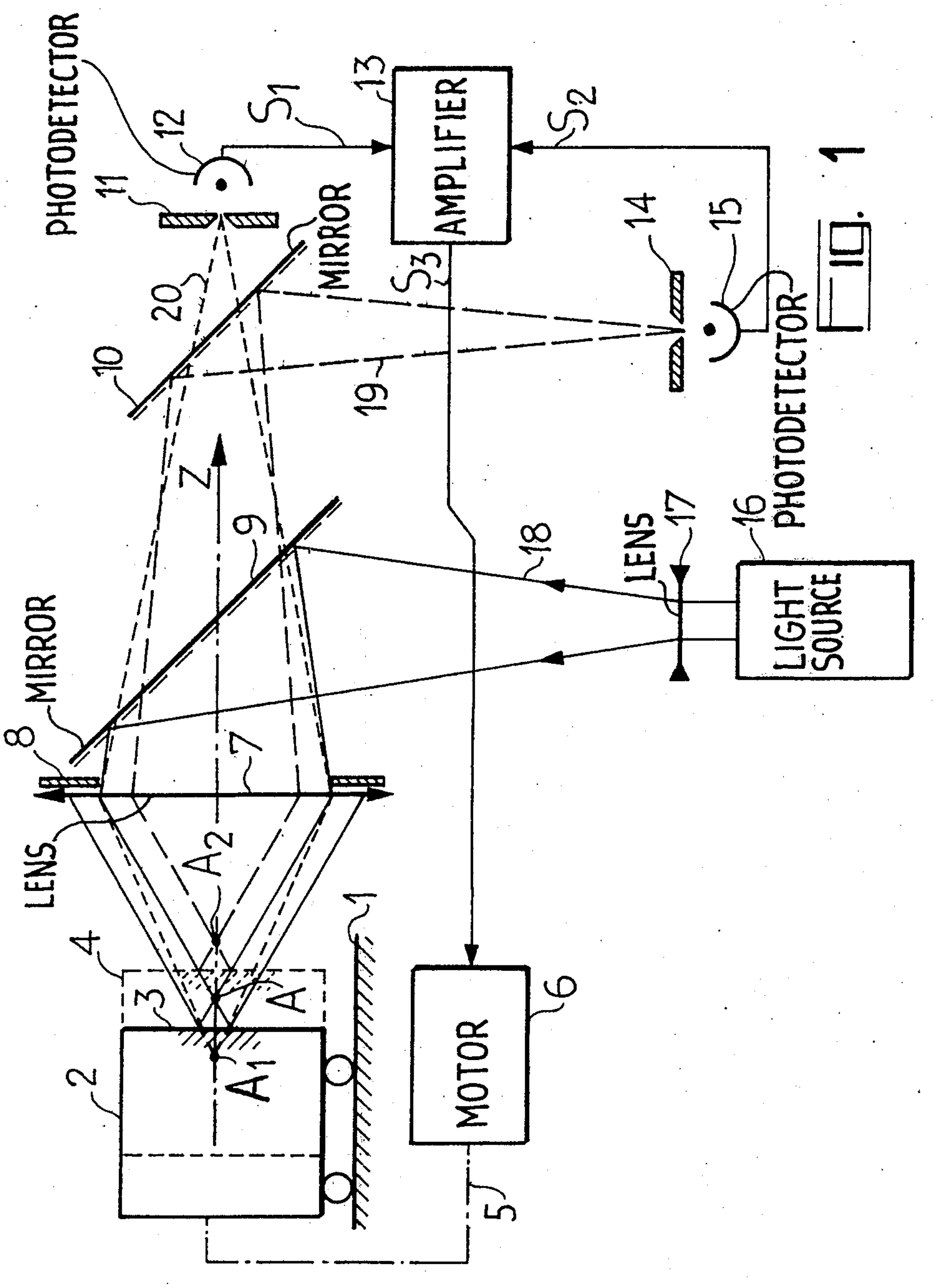
FIG. 1 illustrates a focussing error sensing device in accordance with the invention.

FIG. 1 shows a device for determining the focussing error of a projection lens 7 intended to effect quasi-point illumination of the surface of an object 2. To simplify the ensuing explanation, the projection lens 7 has been assumed to be fixed as also is the base 1 upon which the object 2 is capable of displacing between the extreme positions represented respectively in full line and broken line. A diaphragm 8 delimits the pupil of the projection lens 7 which, through the medium of a semi-transparent plate 9, receives a radiant energy beam 18 issuing from a coherent source 16. The divergence of the beam 18 has been accentuated by means of a negative lens 17 located at the exit of the source 16. The radiation reflected by the plate 9 converges at the geometric centre of convergence A, after having passed through the projection lens 7. In the example shown in FIG. 1 the centre of convergence A occurs at the centre of the focussing range delimited by the extreme positions 3 and 4 of the cross-hatched reflective face of the object 2. For the position 3 on the part of the reflective face, the rays which diverge from the point A are reflected in accordance with the full lines, as if the radiation had come from the point $A_1$ the latter being the image of the point A. For the position 4, the reflected radiation represented by the broken lines, passes through the projection lens 7 again, and is concentrated in the aperture of a diaphragm 11; this aperture has a centre which is the conjugate of point $A_1$ and it is followed by photodetector 12. The radiation issuing from the point $A_2$ also passes through the projection lens 7 again and, after being reflected at a semi-transparent plate 10, is concentrated in the aperture of a diaphragm 14. The centre of this aperture is the conjugate of the point $A_2$ and it is followed by a photodetector 15. The voltages $S_1$ and $S_2$ respectively produced by the photodetectors 12 and 15, are received by electrical means in the form of a differential amplifier 13 at whose output a voltage $S_3$ is produced which is proportional to the difference of the voltages $S_1$ and $S_2$. The voltage $S_3$, whose amplitude and sign represent the focussing errors, can be applied to a servo-motor 6 which, through the mechanical linkage 5, makes it possible to automatically effect correction of the focussing, by an appropriate displacement of the object 2.

The line of the rays as produced in FIG. 1, has been drawn within the context of geometric optics, disregarding diffraction effects. A full account of these effects is given in the following book: "Optics" by Sommerfeld, vol IV, Academic Press Inc, New York, 1954, more particularly on pages 225 to 227 and 320 to 323, where the diffraction produced near focal points by a circular aperture is reviewed.

Figure 2:
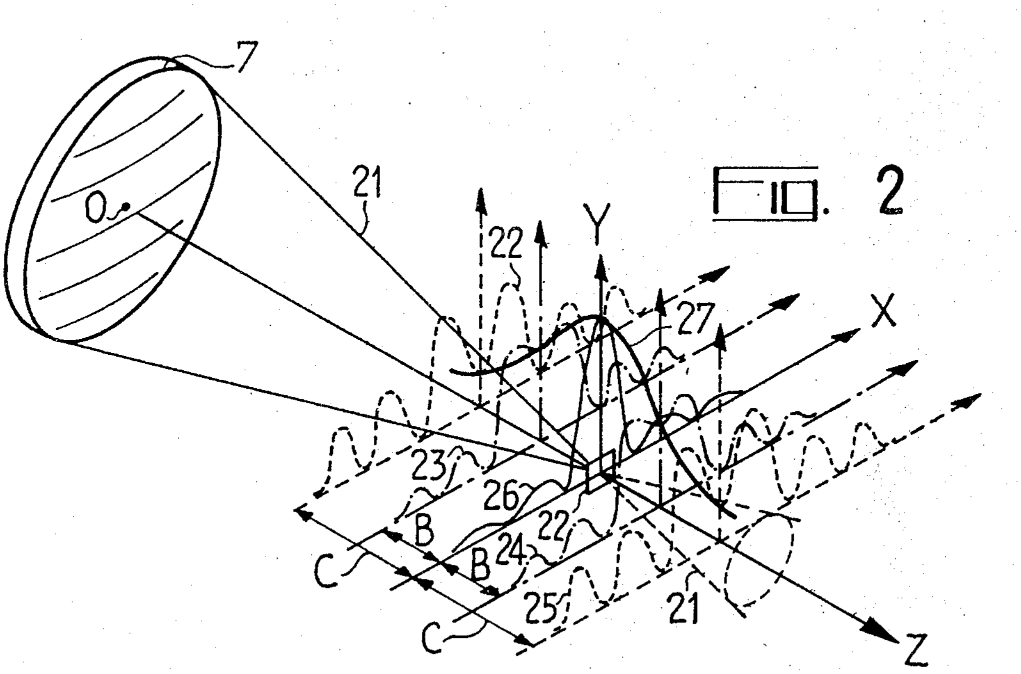
FIGS. 2 and 3 are explanatory diagrams.

To illustrate the influence of the diffraction effect, in FIG. 2 the illumination distributions which are effectively produced in a detection plane perpendicular to the optical axis OZ of the projection lens 7 and capable of occupying five distinct positions on said optical axis, have been shown.

In full line, the position of the detection plane XY has been shown, which coincides with the geometric centre of convergence of the radiation issuing from the objective lens 7, and, in this plane, a cross-hatched area has been indicated to depict the sensitive face 22 of one of the photodetectors of FIG. 1. The variation in the illumination in accordance with the X direction, has been illustrated, the ordinates plotting the luminous intensity Y, and, since the detection plane is located at the point of geometric convergence, the diffraction pattern 26 is obtained which is that which would normally be obtained in the neighbourhood of the focus of an objective lens.

In accordance with the invention, the active face 22 of the photodetector, only picks up that fraction of the radiated energy, which is contained in the body of the diffraction pattern 26. The side lobes of the diffraction pattern, are formed around the face 22 and are constituted by bright rings since the lens 7 is a spherical lens. If the detection plane XY is shifted, or the geometric centre of convergence of the beam 21, in order to produce a displacement B or D, the diffraction pattern 26 will change appearance. In respect of these out of focus positions, the illumination distributions 23, 24 and 25 are produced, these having been shown in borken line or in chain-dotted line. An examination of these distributions shows a progressive alteration in the body of the diffraction pattern, which begins to hollow out as its centre and widen at the same time. Simultaneously, there is observed an intensification of the side lobes of the diffraction pattern. Since the sensitive face 22 of the photodetector is limited to the body of the diffraction pattern, as said face is moved away, along the Z direction, from the geometric centre of convergence of the beam 21, the energy received varies in accordance with the curve 27.

The peak in the curve 27 is produced when the face 22 coincides with the geometric centre of convergence of the beam 21.

Figure 3:
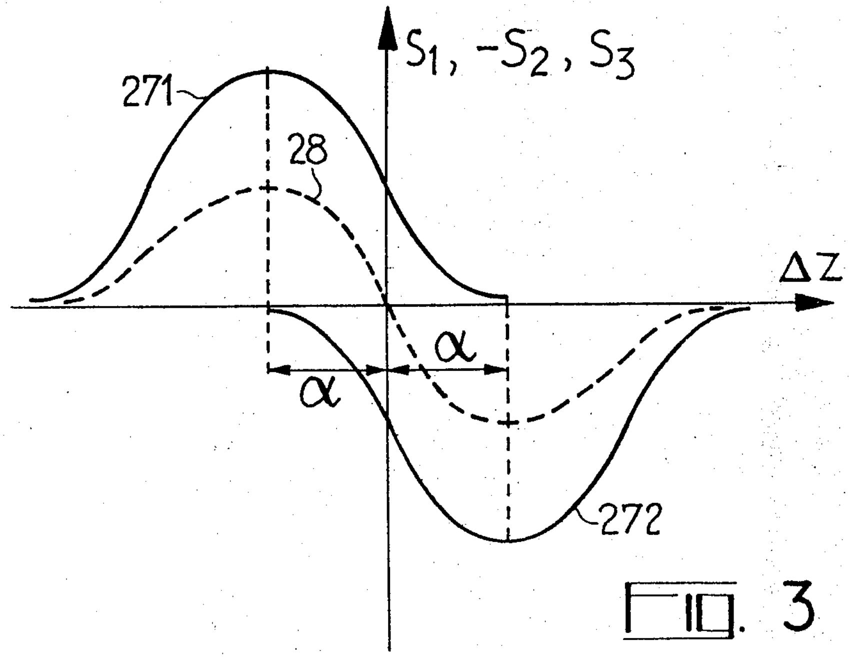

Referring now to FIG. 1, and assuming that the apertures of the diaphragms 11 and 14 are sufficiently small only to transmit the radiant energy contained in the body of the diffraction patterns formed by the projection lens 7, it will be seen that the voltage produced by the photodetector 12 is at a peak when the reflective face of the object 2 is in the position 3, whilst the voltage $S_2$ produced by the photodetector 15 reaches its peak when the reflective face of the object 2 displaces short of and beyond the positions 3 and 4, the voltages $S_1$ and $S_2$ varying in the manner indicated by the curves 271 and 272 of the diagram shown in FIG. 3. In this diagram, the displacements $\Delta Z$ of the reflective face of the object 2 have been illustrated; the positions 3 and 4 correspond to displacements $\alpha$ to either side of the centre of the focussing range and, as illustrated in FIG. 2, these positions are those of the maximum of the curves 271 and 272. The voltage $S_3$ is likewise illustrated in the diagram of FIG. 3, it having been assumed that it is equal to $$\frac{S_1 - S_2}{2},$$

it will be seen that between the abscisse points $\Delta Z = -\alpha$ and $\Delta Z = +\alpha$, the curve 28 which represents the voltage $S_3$, has a negative slope and exhibits a zero transit at the centre of this range. The voltage $S_3$ is sufficient to control the servomotor 6. When the reflective face of the object 2 is located between the positions 3 and 4, the positional control tends to prevent the reflective face from moving away from the position passing through the point A; this latter position, which is the equilibrium position of the controlled system, can be modified by displacing the receptor faces of the photodetectors 12 and 15 in relation to the projection lens 7.

The invention is not limited to the case shown in FIG. 1, which has recourse to two photodetectors. It is possible to determine the focussing error of the objective lens using only the photodetector 12, provided that the focussing range is located on one of the flanks of the curve 271. In this case, the voltage $S_2$ is a direct reference voltage, so chosen that the equilibrium point of the controlled system is at midheight on the flank of the detection curve 271. Operation with two photodetectors has the advantage, however, of widening the focussing range and linearising the control function at the centre thereof.

The invention is not limited, moreover, by the need to provide control of the focussing. In other words, the voltage $S_3$ could be supplied to a simple instrument of the galvanometer type, in which calibration is executed directly in terms of the focussing error.

In commencing the description of FIG. 1, the major emphasis has been upon the structure of the optical sensor device, without reference to any particular application.

In practice, the optical sensor device can be perfectly integrated into any optical system requiring the focussing of an objective lens already being used to project a concentrated spot onto a surface. Where the application envisaged is concerned, it matters little whether the projection of the spot is effected by a system of cylindrical lenses or by a system of spherical lenses; furthermore, the objective lens could equally well be of the catoptric or dioptric type.

Figure 4:
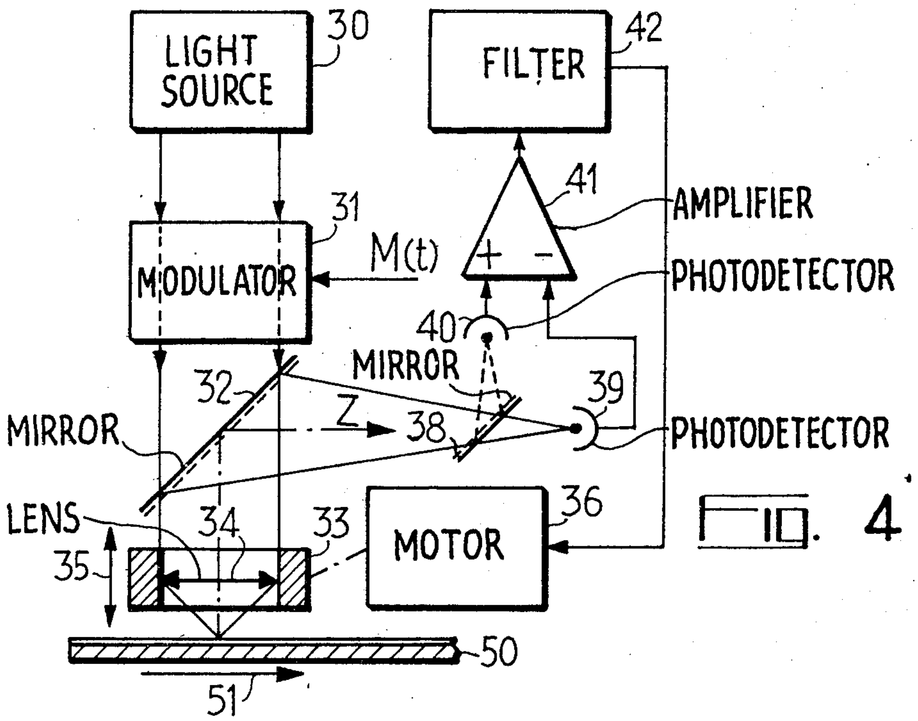
FIG. 4 illustrates a system for recording signals, with automatic focussing utilising the optical sensor in accordance with the invention.

In FIG. 4, by way of non-limitative example, a schematic illustration of the application of the optical sensor device in accordance with the invention to an optical system designed to record a signal $M(t)$ along a track carried by a substrate 50, executing a transfer motion 51, has been given. The substrate 50 is illuminated by a concentrated spot projected by a recording head. The recording head is constituted by a radiation source 30, an optical modulator 31 and a projection lens 34, the lens mounting 33 of which can displace in the direction 35 under the control of a servomotor 36. The device for sensing the focussing error, comprises a semi-transparent plate 32 which reflects onto another semi-transparent plate 38 the radiation reflected by the substrate 50 after passage through the projection lens 34; it also comprises the photodetectors 39 and 40 and the differential amplifier 41. A low-pass filter 42 connects the output of the amplifier 41 to the control input of the servomotor 36 so that the feedback loop controlling the height of float of the projection lens 34, is completed.

FIG. 4 differs from FIG. 1 due to the presence of the optical modulator 31, which as the case may be, can take the form of an electro-optical or acousto-optical modulator. The beam emerging from the modulator has a dual function, in the same way as the projection lens 34, since it is involved in the recording of the information and is responsible for sensing the focussing error of the concentrated recording spot upon the substrate. For these two functions to be compatible, it is necessary that the signal $M(t)$ should not contain any direct components or any alternating components which fall within the control frequency band. Therefore, the signal $M(t)$ must be ridded of any direct component and alternating modulation components should be above the cut-off frequency of the low-pass filter 42.

The recording assembly shown in FIG. 4 can operate simply with the photodetector 39. In this case, if the beam picked up by the projection lens 34 is substantially parallel, it is a good idea to substitute for the plate 38 a lens whose power will be chosen in order to ensure convergence of the reflective beam on the photodetector 39, without which convergence could occur at a very distant point in respect of the ideal focussing position.

Figure 5:
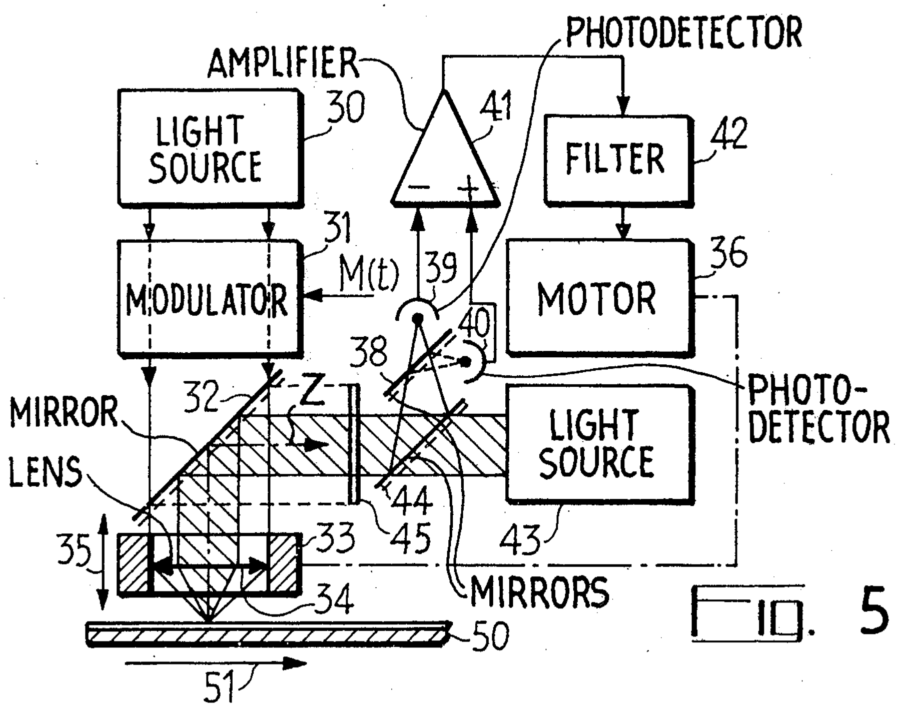
FIG. 5 illustrates a variant embodiment of the recording system of FIG. 4.

FIG. 5 illustrates a variant embodiment of the recording system shown in FIG. 4. In addition to the radiation source 30 designed to record the information $M(t)$, it comprises another radiation source 43 whose wavelength of emission, $\lambda_2$, differs from the wavelength $\lambda_1$ emitted by the source 30. A semi-transparent plate 44 is added to enable the introduction of the focus sensing beam emitted by the source 43 and to direct onto the photodetectors 39 and 40 that portion of said sensing beam which is reflected by the substrate and passed through the projection lens 34 again. An optical filter 45 which selectively transmits the radiation of wavelength $\lambda_2$, prevents the other radiation, of wavelength $\lambda_1$, from exciting the photodetectors 39 and 40. Self-evidently, if the photodetectors are insensitive to the radiation of wavelength $\lambda_1$, then filter 45 can be dispensed with.

The assembly shown in FIG. 5 has two advantages over that shown in FIG. 4. One of these advantages is that the modulating signal $M(t)$ is a matter of arbitrary choice; the other advantage is that in order to widen the focussing range, the transverse section of the monitoring beam picked out in cross-hatched fashion, can be reduced whilst retaining a substantial cross-section for the recording beam, the latter being necessary in order to achieve a very fine spot. The reverse is equally possible, if it is required to achieve very tight focussing control, in particular during the adjustment which precedes the setting into operation of the recording system.

Figure 6:
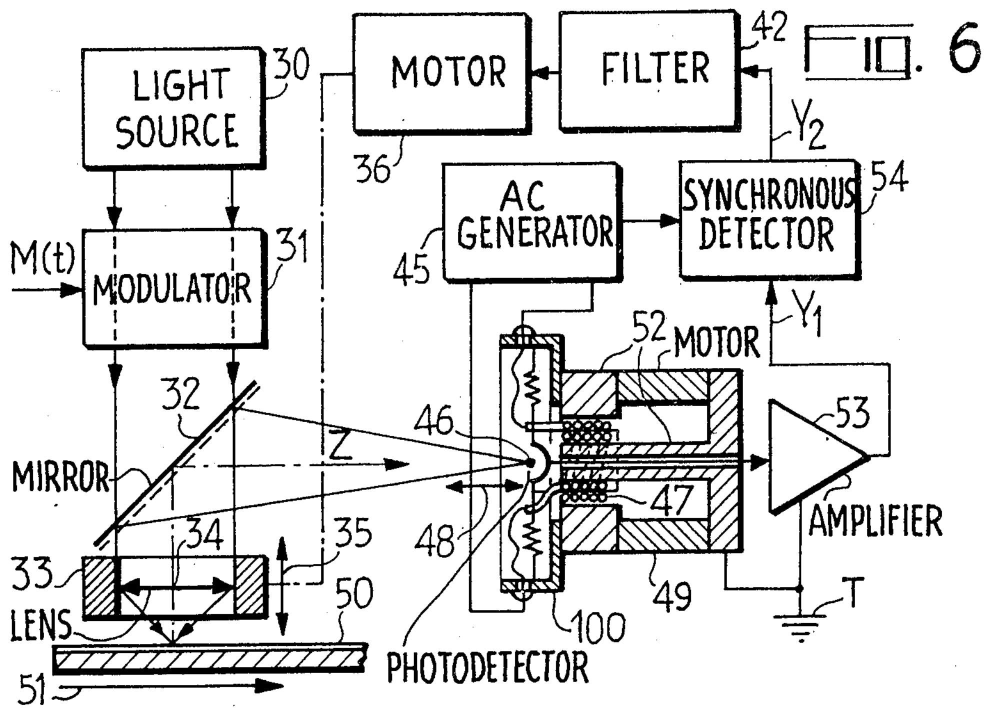
FIG. 6 illustrates another variant embodiment of the recording system of FIG. 4.

FIG. 6 shows another variant embodiment of a recording system whose focus sensing device comprises a single photodetector 46 undergoing an alternating motion in the direction of the optical axis of the objective lens 34, said latter direction being horizontal if one takes into account the semi-reflective plate 32. The alternating displacement of the transducer 46 is produced by a vibration generator which, by way of example, comprises a diaphragm 48 stiff mounted in a supporting member 100, a moving coil 47 fixed to the diaphragm 48 and a magnetic cupped component formed by the assembly of the pole-pieces 52 and a magnetised ring 49. An alternating generator 45 causes an alternating excitation current to flow in the coil 47, producing the periodic displacement of the photodetector 46. The output voltage of the photodetector 46 is transmitted through an amplifier 53 to one of the inputs of a synchronous detector 54; the other input of this synchronous detector is supplied by the alternating generator 45. The voltage $Y_1$ picked up by the synchronous detector 54 makes it possible, at its output, to obtain a voltage $Y_2$ which, after smoothing through the low-pass filter 42, indicates the focussing error on a volt meter. This indication can be used to control a servomotor 35 which shifts the mounting 33 of the projection lens 34 in the direction 35.

The operation of the focus sensing device in accordance with FIG. 6 can be understood through the diagrams (a), (b), (c) and (d) of FIG. 7.

The diagram (a) of FIG. 7 illustrates the variation of the voltage $Y_1$ of the output of the amplifier 53, as a function of the position occupied by the photodetector 46 along the optical axis Z of the projection lens 34; the graph 55 is similar to the graph 27 of FIG. 2 and its peak corresponds to that position of the photodetector 46 for which the projection lens 34 is directing onto its surface a beam which converge there. The diagram (c) represents as a function of time, the positions occupied by the photodetector 46, taking into account its axial vibration. The graph 56 relates to the case where the focussing is correct and the graphs 57 and 58 correspond to cases where there is a focussing error, this meaning that the graph 56 representing the vibration of the photodetector 46, is in effect shifted to the right or to the left.

The diagram (b) can readily be deduced from a comparison with diagrams (a) and (c); it illustrates the voltage $Y_1$ as a function of time, for the three focussing positions illustrated by the diagram (c). The displacement graphs 56, 57 and 58 respectively correspond to the voltage oscillograms 66, 67, 68 and on the time axis the instants O, $T_1$ and $T_2$ have been marked which define each half-period of vibration of the photodetector. The diagram (d) represents the vibration on a time basis, for the voltage $Y_2$ produced by the synchromous detector 54; it is derived from the diagram (b) by changing the sign of the voltage $Y_1$ with each half-period, this, for the three indicated positions, producing three oscillograms 76, 77 and 78. The oscillogram 76 which corresponds to correct focussing, has a zero mean value whilst oscillograms 77 and 78 respectively have a mean negative and positive value.

After passage through the smoothing filter 42, the mean values provide an indication of the focussing error on the part of the projection lens 34; this indication is obtained in magnitude and in sign, as in the case of FIG. 1. The advantage of the sensor device shown in FIG. 6 is that there is no need to select two matched photodetectors having stable properties; moreover, the amplifier can be an a.c. one, eliminating the errors which are due to drift in the working point. The frequency of vibration of the photodetector 46 is made higher than the frequencies to which the positional control is designed to react. If the modulating signal $M(t)$ embraces frequencies likely to disturb the operation of the sensor device, then the decoupling technique illustrated by FIG. 5 should be adopted.

In the description of FIGS. 4 to 6, we have considered the case of a system for recording information upon a substrate. However, the invention is equally applicable to a system for reading out information stored on a substrate, where said system comprises an optical arrangement for producing a concentrated spot. The projection system may project a circular or a linear spot, as required, provided that the projected radiation is concentrated at least in a plane passing through the optical axis of the projection objective lens.

The focus sensing device in accordance with the invention makes it possible to utilise a substrate of arbitrary nature provided that its surface is sufficiently smooth to reflect at least very largely, images of the geometric centre of convergence of a concentrated illuminating beam. It offers the advantage that that zone of the substrate which is involved in determining the focussing error, is of the same order of magnitude as the recording spot or read-out spot; furthermore, it makes the best possible use of the optical elements required for the projection of the spot, and this makes it more simple and less expensive to put into effect.

What we claim is:

1. Optical sensor for determining the focussing error of an optical illumination system wherein a projection lens is used to focus a beam of radiant energy on a reflecting surface, said optical sensor comprising photodetector means having a predetermined detection area arranged for selectively receiving at least one radiant energy portion emerging from the illuminated portion of said reflecting surface and focussed by said projection lens in the form of a diffraction pattern; the body of said diffraction pattern being substantially equal to the detection area of said photodetector means; said optical sensor further comprising electrical means connected to said photodetector means for supplying a voltage representative of said focussing error.

2. Optical sensor as claimed in claim 1, wherein said photodetector means comprise two fixed photodetector elements; said fixed photodetector elements being respectively arranged to receive from said projection lens sharp images of the focus of said beam for two positions of said reflecting surface delimiting the focussing range of said optical illumination system; said electrical means comprising differential amplifier means having differential inputs respectively connected to the respective outputs of said fixed photodetector elements.

3. Optical sensor as claimed in claim 1, wherein said photodetector means comprise a moveable photodetector element, vibrational means for displacing said moveable photodetector element along the optical axis of said projection lens, and an electrical a.c. generator for energizing said vibrational means; said moveable photodetector element being arranged in one of its extreme positions to receive from said projection lens a sharp image of the focus of said beam for a position of said reflecting surface corresponding to one end of the focussing range of said optical illumination system; said electrical means comprising synchronous detection means having one input connected to the output of said electrical a.c. generator and a further input coupled to the output of said moveable photodetector element.

4. System using concentrated illumination of a reflecting surface for diffusion of information bearing signals through the medium of a recorded track lying in said reflecting surface, said system comprising: a source of radiant energy, a projection lens for concentrating said radiant energy onto said reflecting surface, focussing means associated with said projection lens, optical sensor means for determining the focussing error of said projection lens in relation to said reflecting surface and feedback means returning to the control input of said focussing means the error signal supplied by said optical sensor means; said optical sensor means comprising photodetector means having a predetermined detection area arranged for selectively receiving at least one radiant energy portion emerging from the illuminated portion of said reflecting face and focussed by said projection lens in the form of diffraction pattern; the body of said diffraction pattern being substantially equal to the detection area of said photodetector means; said optical sensor means further comprising electrical means connected to said photodetector means for supplying said error signal.

5. Optical sensor as claimed in claim 3, wherein said vibrational means comprise a moving coil excitation motor.

6. System as claimed in claim 4, wherein a semireflective plate is arranged between said source and said projection lens.

7. System as claimed in claim 4, further comprising an auxiliary source of radiant energy feeding said projection lens; the radiation emitted by said further source having a wavelength differing from the wavelength of the radiation emitted by said source.

8. System as claimed in claim 4, wherein said feedback means comprise a low-pass filter; the frequency band of said low-pass filter being below the frequency range of said information bearing signals.

* * * * *